United States Patent [19]
Slagle et al.

[11] Patent Number: 5,881,359
[45] Date of Patent: *Mar. 9, 1999

[54] METAL AND FLUORINE VALUES RECOVERY FROM FLUORIDE SALT MATRICES

[75] Inventors: Randall P. Slagle, Elizabethton; John D. Davis, Johnson City, both of Tenn.

[73] Assignee: Advanced Recovery Systems, Inc., Erwin, Tenn.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,516,496.

[21] Appl. No.: 614,197

[22] Filed: Mar. 12, 1996

Related U.S. Application Data

[63] Continuation-in-part of Ser. No. 457,261, Jun. 1, 1995, Pat. No. 5,516,496, and a continuation-in-part of Ser. No. 518,846, Aug. 24, 1995, abandoned.

[51] Int. Cl.⁶ ........................................... G01F 1/00
[52] U.S. Cl. ........................ 423/20; 423/158; 423/178; 423/490; 423/253
[58] Field of Search ........................ 423/20, 158, 178, 423/490, 253

[56] References Cited

U.S. PATENT DOCUMENTS

| | | | |
|---|---|---|---|
| H000059 | 5/1986 | Kreuzmann et al. | 423/490 |
| 2,733,126 | 1/1956 | Spiegler | 423/20 |
| 4,564,507 | 1/1986 | Elliott | 423/5 |
| 4,689,178 | 8/1987 | Gay et al. | 252/626 |
| 4,874,599 | 10/1989 | Gay et al. | 423/490 |
| 5,207,999 | 5/1993 | Burk et al. | 423/258 |
| 5,516,496 | 5/1996 | Slage | 423/20 |

OTHER PUBLICATIONS

Mallinckrodt Chemical Works Process Development Quarterly Report No. MCW–1403, 1957.

Robert C. Merritt, The Extractive Metallurgy of Uranium, Colorado Shcool of Mines, pp. 30–32, 1971.

Joseph J. Katz & Glenn T. Seaborg, The Chemistry of the Actinide Elements, pp. 198–199, 1957.

Andrea W. Talbot et al., ed., Science and Technology of Tributyl Phosphate, vol. 1, pp. 172–177, 1984.

*Primary Examiner*—Ngoclan Mai
*Attorney, Agent, or Firm*—Donald W. Spurrell

[57] ABSTRACT

The process for converting feed materials of high mineral content containing primary metal values and fluorine values to the primary metal or useful compounds thereof and to fluorine values or useful compounds thereof, wherein the feed materials constitutes a difficultly soluble matrix, the process having the steps of contacting the feed materials in a reactor with a humidified, gaseous system at from about 200° C. to about 1600° C., the contacting being carried out such as to convert the primary metal values to oxide residues at commercially acceptable rates and to evolve gaseous fluoride from the feed, digesting said oxide residues in an acidic digest medium and separating the primary metal values from the resulting digest liquor and from other components of the residues.

18 Claims, 2 Drawing Sheets

METAL AND FLUORINE VALUES RECOVERY FROM FLUORIDE SALT MATRICES

FIELD OF THE INVENTION

This application is a continuation-in-part of applicants' Ser. No. 08/457,261, now. U.S. Pat. No. 5,516,496; and filed Jun. 1, 1995, and of Ser. No. 08/518,846 filed Aug. 24, 1995, now abandoned all of same title, and the invention concerns the recovery of metal values and fluorine values from various difficultly soluble fluoride matrices from commercial operations, which matrices are produced, e.g., in the production of prime metal values from their fluoride salts employing metallic reducing agents. The invention further concerns the treatment of the redox by-product matrices for recovering therefrom the reducing metal and fluoride values, and, if desired, particularly prime metal values, in purified form. In a particular embodiment, the invention concerns a process for converting refractory uranium-contaminated metal fluoride such as magnesium fluoride, generally considered as low-level radioactive waste, from the uranium metal manufacturing process, (1) to an essentially fully decontaminated, useable magnesium product salt, (2) to purified fluorine values, including anhydrous HF if desired, (3) to recoverable radioactive concentrate, and (4) to a decontaminated raffinate stream amenable to recycle. More particularly, the invention focuses on a decomposition of a magnesium or calcium fluoride matrix with high temperature steam which may be transported in a carrier gas including, e.g., air, nitrogen, or inert or other gasses, on the hydrometallurgical processing of the residue, and on the subsequent recovery of fluorine and metal values as metals or useful compounds thereof.

BACKGROUND OF THE INVENTION

The production of certain metals, such as uranium, is typically done by the reduction of the metal fluoride salt. For example, the reaction of magnesium metal with greensalt ($UF_4$) produces magnesium fluoride ($MgF_2$) and uranium metal. An analogous reduction process is also used for production of beryllium metal and can further be employed in the production of practically any metal including e.g., hafnium, titanium, and zirconium. The redox products are comprised principally of a metal and an alkaline earth fluoride matrix.

The magnesium fluoride invariably emerges from the above reaction with some level of contained uranium contamination, generally exceeding about 30 pCi/g in the case of uranium metal production. The magnesium fluoride typically contains up to about 4.0 wt % uranium within the matrix which is a highly refractive, i.e., relatively insoluble matrix containing a variety of uranium chemical forms and oxidation states. Such matrix is generally classified as a low-level nuclear waste and must be disposed of at a licensed radioactive disposal site. As such, the magnesium fluoride per se, even though not a radionuclide, represents a large liability in terms of disposed costs.

The processing of magnesium fluoride waste by-products in order to extract and concentrate uranium, and to recover magnesium and fluoride values in substantially purified form for further industrial use would reduce this cost liability if the processing procedure were cost effective. Typically, however, magnesium fluoride processing techniques have involved a variety of acid digestions using both inorganic and organic types, both separately and in combination, in the attempt to dissolve the refractory matrix and release the contained metals and other values. Although a fair fraction of material can be dissolved, there still remains a substantial residue containing uranium values significantly in excess of radioactive limits established by Federal Regulations for non-radioactive waste disposal.

DISCUSSION OF THE PRIOR ART

Heretofore, an integrated system dedicated to solving the aforestated problem in an efficient manner has not been directly addressed as will become evident from the following discussion concerning specific prior processing systems for these waste tailings.

In U.S. Statutory Invention Registration Number H59, a process is disclosed for decomposing magnesium fluoride in the presence of calcium oxide, calcium hydroxide, or calcium carbonate at a temperature of at least 1600° F. A final mixture of magnesium oxide and calcium fluoride are produced, from which magnesium oxide is removed from the calcium fluoride using an acid dissolution and filtration. The resulting calcium fluoride is dried and becomes potentially useful for the manufacture of HF by conventional processing. It is apparent that the principal objectives of this prior procedure, and the complexity of the steps involved, are quite different from applicant's and as will become more evident hereinafter.

In U.S. Pat. No. 4,539,187, a method is disclosed for separating and recovering metals such as aluminum, iron, silicon, etc., from flyash or like materials by reacting it with fluorosilicic acid and aqueous hydrofluoric at elevated temperatures. Subsequent operations include separating out insoluble metal fluorides and silicofluorides and capturing and reacting the silica fluoride with water to form pure silicon and hydrogen fluoride, both for recovery. In this process, aluminum and iron fluorides may be separated from one another for eventual recovery of respective metal values. Applicant's process is quite different in many respects, e.g., in Applicant's process hazardous fluorine-bearing acids for digesting feed sediments is not used to degrade the matrix for eventual extraction and recovery of contained components.

In U.S. Pat. No. 3,880,770, a process is described for manufacturing luminescent materials containing magnesium and gallium, whereby a source of fluorine is introduced and heated with other raw metal oxide materials in a humidified, oxidizing atmosphere followed by reheating in a mildly reducing atmosphere, both for set time periods. These procedures are noted to improve the luminescence efficiency of the resulting phosphor, which is a magnesium, manganese, aluminum, gallium, oxide. The objectives and procedures of the present invention are very different, as will become further evident.

OBJECTS OF THE INVENTION

Principal objects, therefore, of the present invention are: to provide a markedly simplified and efficient process for recovering substantial fluorine and metal values, including, e.g., radionuclide values, especially uranium, from refractive metal fluoride by-products such as $MgF_2$ matrices, where refractive metal fluorides are converted to highly acid soluble magnesium oxide without using decomposing calcium salts or other materials which leave residues or by-products which present disposal problems; to provide such a process wherein fluorides are recovered in purified gaseous or liquid form for simplified recycle to the prime metal manufacturing process; to provide such a process which efficiently produces hydrofluoric acid; to provide such a process which efficiently produces anhydrous HF; and to provide such a process wherein the metal, especially magnesium can be recovered as a high value, decontaminated salt with <30 pCi/g activity for metal manufacturing.

SUMMARY OF THE INVENTION

These and other objects hereinafter appearing have been attained in accordance with the present invention which, in a general embodiment, is defined as a process for converting feed materials of high mineral content containing primary metal values and fluorine values to the primary metal or useful compounds thereof and to fluorine, wherein said feed materials comprises a difficultly soluble matrix, said process comprising contacting said feed materials with a system comprising humidified gas including high temperature steam or other $H_2O$ containing gas at from about 200° C. to about 1600° C., said system preferably having oxidizing capacity, said contacting being carried out such as to convert said primary metal values to oxide residues at commercially acceptable rates and to evolve gaseous fluorides from said feed, digesting said oxide residues in an acidic digest medium and separating the primary metal values from the resulting digest liquor and from other residues.

In a more particular embodiment, the present invention is defined as a process for converting feed materials of high mineral content and substantial radioactivity levels to concentrated radionuclide products of high radioactivity levels and to other products of discard or very low radioactivity levels, wherein said feed materials are refractory and contain substantial metal, fluorine, and radionuclide values assaying above about 30 pCi/g, said process comprising contacting said feed materials with high temperature steam or other humidified gas at from about 200° C. to about 1600° C., preferably from about 800° C. to about 1300° C., said gas preferably having oxidizing capacity, said contacting being carried out such as to convert said metal and radionuclide values to oxide residues at commercially acceptable rates and to evolve gaseous fluorides from said feed, digesting said oxide residues in a digest medium wherein the ratio of digest medium in liters (L) to oxide residue in kilograms (KG) is from about 1/1 to 40/1, preferably from about 2/1 to about 20/1, selectively separating said radionuclide values from the resulting digest liquor and isolating said metal values from the resulting raffinate whereby said metal values have a radionuclide value assay of less than about 20% of the radioactivity level of said feed materials.

In certain other preferred embodiments:

(a) the feed materials comprise alkaline earth residues containing either or both of calcium or magnesium fluoride matrices, the said contacting being of sufficient duration to convert all metallic feed elements to oxide form and to collect all fluoride as hydrogen fluoride, and wherein the oxides are subsequently dissolved in an acidic medium to create a digest liquor from which radionuclides and primary metal values can be selectively separated;

(b) wherein the separation of the radionuclide is achieved by solvent extraction; and (c) wherein secondary values of beryllium are present in the feed materials.

BRIEF DESCRIPTION OF THE DRAWINGS

The invention will be further understood from the drawings herein, wherein.

DETAILED DESCRIPTION OF THE INVENTION

In the manufacture of metals such as uranium and beryllium and the like, hereinafter, prime metals, certain alkaline earth metals have been used as reducing agents by reacting them with the prime metal fluoride intermediates in a redox system to produce the prime metal product. In the case of uranium, the hexafluoride intermediate compound thereof is first reduced by hydrogen to produce $UF_4$, known as greensalt, and hydrofluoric acid, i.e., (1) $UF_6 + H_2 \rightarrow UF_4 + 2HF$.

The greensalt is subsequently reacted with magnesium or calcium metal to produce magnesium or calcium fluoride and uranium metal, i.e., (2) $UF_4 + Mg \rightarrow MgF_2 + U_{(s)}$.

Although the products become separated in the above reaction (2), the magnesium fluoride invariably emerges from the process with a fraction of uranium that is trapped inside the refractory fluoride matrix. This matrix is difficult to process and becomes a low-level radioactive waste disposal cost liability.

The uranium concentration in the magnesium fluoride matrix can vary considerably, however, typically the matrix composition is about 38% magnesium, about 58–59% fluoride and 1–2% uranium. Higher or lower levels of these constituents occur depending upon operational efficiency or the like.

Figure 1:
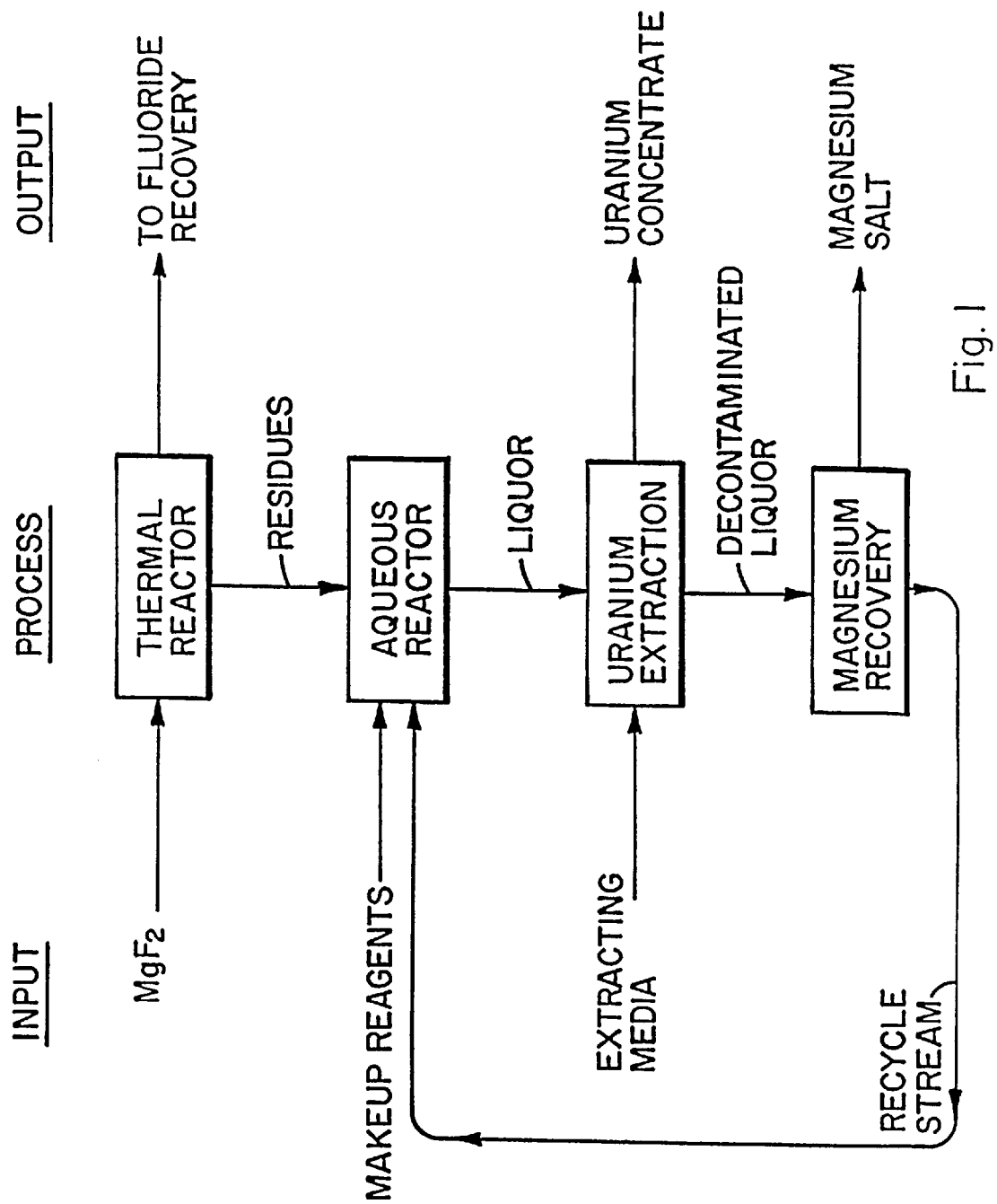
FIG. 1 is a schematic flowsheet for the present overall process, as applied to radioactive feed material.
Figure 2:
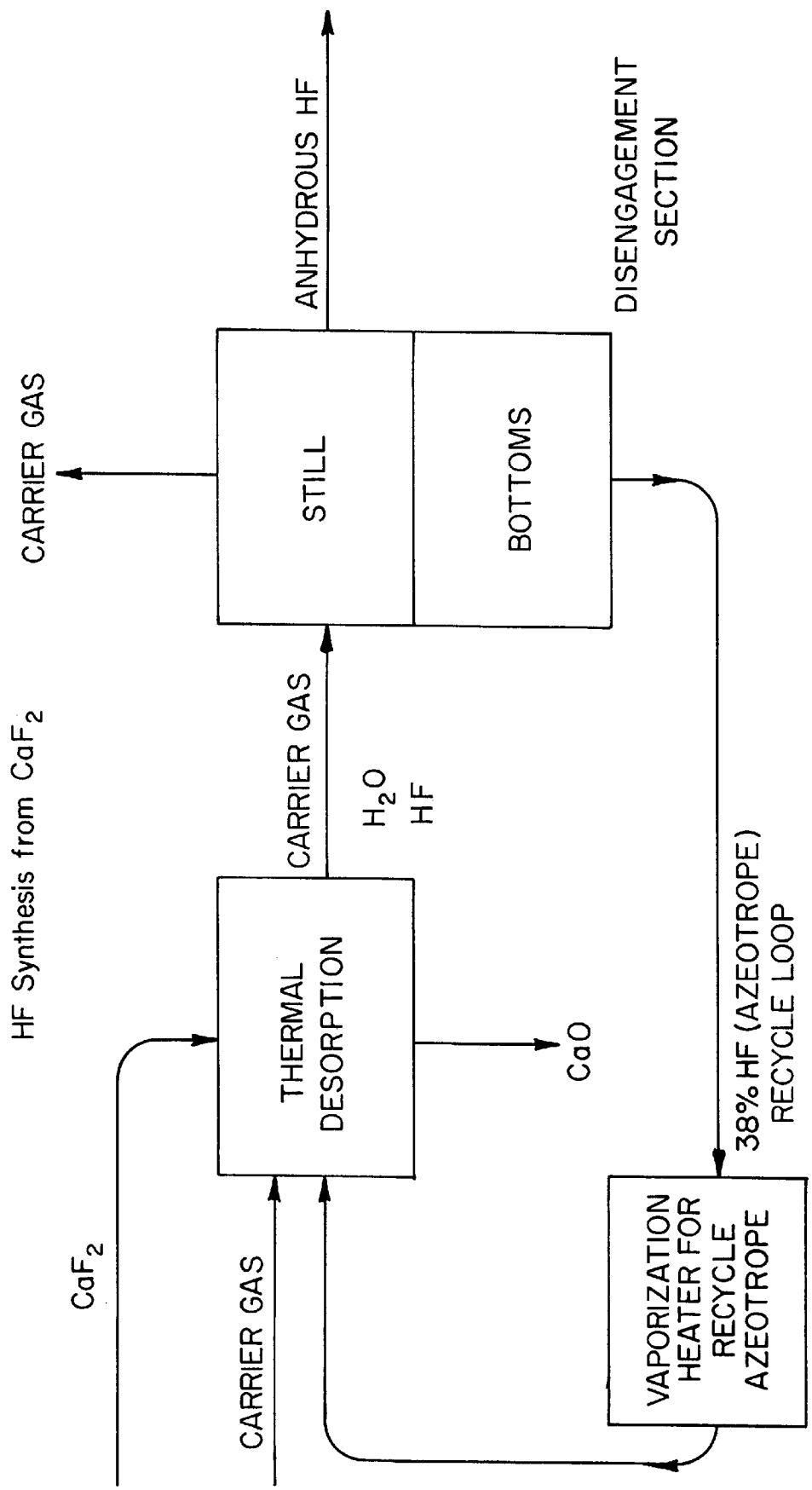
FIG. 2 is a schematic flowsheet for use of the present process in the production of anhydrous HF from a difficultly soluble fluoride matrix.

In the present invention, as indicated by FIG. 1, the magnesium fluoride is treated in the thermal reactor with a system comprising humidified gas such as high temperature carrier steam or humidified gas ($O_2$, $N_2$, air, or the like) to begin the process. This system preferably provides an oxidizing capacity for converting metal components to more soluble oxidation states. The temperature of the steam or carrier gas is preferably around 1000° C. or higher, but could be as low as about 200° C. and as high as about 1600° C. Oxygen or oxygen containing additives such as peroxides, persulfates, or alcohols may also be used in conjunction with humidified gas or steam in concentrations to give a supplementary oxygen level of, e.g., 20%–50% or more of the primary reactive oxygen level, i.e., oxidation capacity of the gas, such as to enhance the conversion of feed material to more soluble oxide form. The fluorine atoms are efficiently desorbed to the steam, with the reaction usually becoming complete in from about five to about ten hours. The fluorine in the matrix is mobilized to the steam and converts to hydrogen fluoride, which is subsequently condensed and collected in a fluoride recovery section. This reaction is represented as (3) $MgF_2 + H_2O \rightarrow MgO + 2HF$ and additional unit operations may be invoked at this point to further purify the hydrogen fluoride and/or to create an anhydrous hydrogen fluoride from it such as shown in FIG. 2. The hydrogen fluoride, in general, becomes a recyclable product. It is noted that by adding a cation reactive agent, e.g., such as aluminum hydroxide, $Al_2O_3 \cdot 3H_2O$, calcium oxide or the like to the mobilized fluorine stream, other valuable fluoride compounds can be synthesized in addition to HF, such as aluminum fluoride ($AlF_3$), calcium fluoride ($CaF_2$), and analogous compounds.

The residue solids remaining are principally magnesium and uranium oxides with minor other non-strippable impurities. These solids contain the bulk of the uranium from the magnesium fluoride pyrohydrolysis and can be dissolved essentially completely in a variety of acids such as hydrochloric, nitric, or sulfuric, or mixtures thereof to produce dissolved magnesium and uranium salts. An advantage of this pyrohydrolysis process is that at most, only a minute fraction of the residual solids are insoluble in the acid medium, i.e., generally <1% as will be shown by the examples herein. Another advantage is that refractory uranium material is converted to a more soluble oxidation state which is readily soluble in acidic medium. Exemplary dissolution reactions for the residue solids employing hydrochloric acid are as follows:

(4) $MgO + 2HCl = Mg^{+2} + 2Cl^- + H_2O$; and (5) $UO_3 + 2HCl = UO_2^{+2} + 2Cl^- + H_2O$ or (6) $UO_2 + 4HCl = U^{+4} + 4Cl^- + 2H_2O$ Analogous reactions occur in the dissolution of the solids in either sulfuric or nitric acids. The initial concentrations of the acidic medium can range, e.g., from about 1.0 to about 12.0 molar, with from about 4.0 to about 8.0 molar being preferred.

Once dissolved in acidic liquor, the uranium may be selectively extracted therefrom and from the magnesium by any of a variety of solvent extraction systems to produce very low levels of uranium in the raffinate (extracted liquor). The extraction may be carried out multiple times by the appropriate solvent to enhance the extraction efficiency. This solvent is then contacted, preferably multiple times, with a desired stripping agent to re-extract uranium into said agent and free the extractant for further use. The stripped solvent is then returned for further use in the extraction procedure.

Useful extraction solvents include the myriad of those disclosed in the literature such as n-tributyl phosphate in kerosene, DEHPA/TBP combinations, trioctylphosphine oxide in kerosene, or any of a variety of amines.

The uranium-free liquor or raffinate is now subjected to a magnesium salt recovery phase. The salt may be recovered in purified form by any of several techniques. For example, raffinate may be evaporated to produce uranium-free crystals of a magnesium salt of the acid anion.

Alternatively the extracted liquor may be contacted with the recovered hydrogen fluoride solution from the thermal desorption, and the pH adjusted with, for example, ammonium carbonate, until magnesium fluoride is regenerated. The adjusted pH generally would be about 7, but may be in the 1 to 12 range. A solid forms which is principally uranium-free magnesium fluoride. This solid is then filtered from the slurry and washed with water. The resulting cake is heated, e.g., at about 110° C. to remove surface waters and at, e.g., about 700° C. to remove bound waters. The resulting cake is discharged and either recycled or disposed of as a radioactive-free salt.

It is noted that beryllium metal is also produced by a reducing reaction analogous to (2) above, i.e., (7) $BeF_2 + Mg(s) = MgF_2 + Be(s)$.

The flowsheet in FIG. 1 is generally applicable for extracting other metals such as beryllium from magnesium fluoride. Invariably, the magnesium fluoride contains concentrations of beryllium, which are considered as hazardous materials. In this case, the beryllium contaminated magnesium fluoride would be thermally treated as above to first form magnesium oxide, which subsequently would be dissolved in an acidic digest medium for subsequent extraction of the beryllium. The magnesium salt is recovered in a manner similar to that described above.

Other actinide series metals (atomic numbers 89 through 103) besides uranium are synthesized from their fluorides in a similar fashion to reactions (2) and (7) above by reducing the fluoride compound with an electropositive metal from Group 1A or 2A to form a refractive, radioactivity-contaminated fluoride slag, e.g.:

(8) Protactinium: $PaF_4 + 2Ba \rightarrow 2BaF_2 + Pa_{(s)}$;

(9) Neptunium: $2NpF_3 + 3Ba \rightarrow 3BaF_2 + 2Np_{(s)}$;

(10) Plutonium: $2PuF_3 + 3Ca \rightarrow 3CaF_2 + 2Pu_{(s)}$;

(11) Americium: $2AmF_3 + 3Ba \rightarrow 3BaF_2 + 2Am_{(s)}$;

(12) Curium: $2CmF_3 + 3Ba \rightarrow 3BaF_2 + 2Cm_{(s)}$.

Furthermore, certain lanthanide series (atomic numbers 57 through 71) and Yttrium fluorides have been used as precipitating agents in actinide separations. For example, lanthanum fluoride ($LaF_3$) is used to carry curium and separate it from americium. These lanthanide fluorides, therefore, also contain radioactivity associated with actinide elements.

With regard to lanthanide series metals (as defined above) that are contained within refractive by-product calcium or magnesium matrices derived from metallothermic lanthanide metal synthesis, the composite lanthanide-containing oxide matrix resulting from the present thermal treatment could be processed by dissolution in an acid digest medium, e.g., HCl or $H_2SO_4$, and subsequently separated by a selective extraction technique, e.g., solvent extraction. Applicable extracting solvents of the organophsphine variety, e.g., trioctylphosphine oxide or commercial brands typical of which are Cyanex 272, 301 alone or in combination with dialkylphosphoric acids, e.g., di-2-ethylhexylphosphoric acid, etc., will remove the lanthanide elements from calcium or magnesium at Ph in the range of 1 to 4, and preferably about 2. These extracting systems can be stripped to recover the lanthanide metal by using a strong mineral acid. The extracted liquor, now depleted in lanthanide metal content, is processed through a crystallizer for recovery of calcium or magnesium salts.

In summary the process described in this application is also applicable to extract other actinides besides uranium from Group 1A and Group 2A refractive metal fluoride slags and from lanthanide series fluorides; recover metals as refinable salts from Group 1A, 2A, and from the lanthanide series fluorides; and to recover fluorine values.

Certain ores may also be treated by the present process. For example, bastnasite is a mixed lanthanide fluoride carbonate matrix of generic formula $La(FCO_3)$. The current practice is to treat mined ores by comminution followed by froth flotation to produce a lanthanide concentrate. This concentrate is processed further by roasting in air to oxidize cerium to the +4 state, and subsequently leached with hydrochloric acid to produce a soluble feedstock and an insoluble cerium concentrate. By using the process described herein, the comminuted ore feed can be oxidized directly, thereby converting the carbonate fluoride matrices to oxides. These oxides are then readily soluble in mineral acids for further separation of lanthanide products.

The ranges of thermal process (pyrohydrolyis) and other conditions and operating parameters are as follows:

| Condition | Thermal Process | Preferred Thermal Process |
|---|---|---|
| T° | 200° C.–1500° C. | 800° C.–1300° C. |
| Time | 2–10 hours | 4–6 hours |
| Molarity | N/A | N/A |
| Solids (Kg/L) | N/A | N/A |
| Condition | Digestion | Preferred Digestion |
| T° | Ambient 90° C. | 75° C.–85° C. |
| Time | 0.5–6.0 hours | 1–3 hours |
| Molarity | 1–12 | 4–8 |
| Solids (Kg/L) | 1:1–1:40 | 1:2–1:7 |
| Condition | Extraction | Preferred Extraction |
| T° | Ambient | Ambient |
| Time | 1–30 minutes | 2–4 minutes |
| Molarity | — | — |
| Solids (Kg/L) | — | — |

EXAMPLE A

THERMAL TREATMENT OPERATION

A magnesium fluoride matrix resulting from the manufacture of uranium metal was processed in accordance with the present invention. The assayed composition of the matrix by weight was about 97–98% magnesium fluoride and about 1.7% uranium. The matrix was treated by thermal desorption, i.e., pyrohydrolysis, using steam as a carrier flowing over a comminuted bed of the matrix, at about 1100° C. The purpose of the treatment was to remove fluoride from the matrix leaving a residue that could be readily dissolved such that the uranium could be removed by solvent extraction and the magnesium reprecipitated, e.g., with the removed fluoride for the subsequent production of a uranium-free magnesium oxide.

In performing the above process, a quantity of 79.9 grams of magnesium fluoride matrix was placed in a furnace maintained at about 1100° C. and steam containing some oxygen was passed over the sample so as to collect about 160 ml of condensate in one hour. The sample was treated for about 9 hours. A total of 2920 ml of condensate was collected containing 47.1 grams of dissolved HF as determined by ion chromatography. The residue was 52.2 grams assaying at 58.16% magnesium and 2.61% uranium.

EXAMPLE B

DISSOLUTION OF Ma/U RESIDUES

A 40.0 gram aliquot of the above residue was dissolved in 150 ml of concentrated nitric acid and 450 ml of water in about 15 minutes at 80°–90° C. The digest solution was filtered and the solids washed with about 20 ml of water and then dried to a total of 0.06 grams. The resulting highly acidic first raffinate solution volume was 620 ml with a magnesium concentration of about 37,525 ppm and a uranium concentration of about 1684 ppm.

EXAMPLE C

EXTRACTION OF URANIUM

The 620 ml first raffinate solution was added to 600 ml of an extractant, 15%v/v of TBP-in-kerosene (solvent), and mixed for 2 minutes. The aqueous phase (second raffinate solution) was drained off and the solvent was stripped with 612 ml of water. The aqueous strip solution was drained off and analyzed to give a magnesium concentration of 46 ppm and a uranium concentration of 1679 ppm. The resulting second raffinate solution (620 ml) contained substantially the same magnesium concentration as the first raffinate solution but a uranium concentration of only 8.7 ppm. A 610 ml aliquot of the second raffinate solution was added to the stripped solvent and mixed for 2 minutes. The aqueous phase (third raffinate solution) was drained off and analyzed to give a magnesium concentration of about 37,885 ppm and a uranium concentration of 0.9 ppm.

EXAMPLE D

RECONSTITUTION OF MAGNESIUM SALT

A 600 ml aliquot of the above third raffinate solution was added to 2870 ml of the fluoride condensate from Example A and diluted with 3950 ml of water. The pH of the solution was adjusted to 7 with ammonium carbonate. The solution was filtered and the filter cake dried at 100° C. overnight and at 700° C. for 2 hours. The dried cake totaled 54.1 grams with a magnesium concentration of 38.46%, a fluoride concentration of 61.98%, and a uranium concentration of 6ppm (2.4 pCi/g). Based on these results, 99% of the uranium was removed from the magnesium fluoride matrix and recovered in the strip solution, and essentially a 100% magnesium fluoride salt product with <30 pCi/g uranium activity was generated based on the original magnesium and fluoride values.

EXAMPLE E

PREPARATION OF MAGNESIUM CHLORIDE LIQUOR

A quantity of 5.6 grams of the residue produced in Example A from the thermal treatment of contaminated magnesium fluoride matrix was mixed with 200 ml of 6.8 molar hydrochloric acid. Several drops of 30% hydrogen peroxide were then added to this mixture. The mixture was stirred and heated for about 3 hours until nearly all of the solids appeared to be dissolved. The resulting solution was filtered. The filtrate measured about 180 ml. The filtered solids weighed 0.1 grams, indicating that 98.2% of the residue dissolved in the hydrochloric acid.

EXAMPLE F

EXTRACTION OF URANIUM FROM MAGNESIUM CHLORIDE LIQUOR

The 180 ml of filtrate from Example E, containing about 800 ppm uranium, was contacted three times with 180 ml of fresh 15% by volume (15 v/v) of n-tributylphosphate (TBP) in kerosene. Contact times were for a minimum of 2 minutes. The resulting third raffinate solution contained <1 ppm uranium, indicating that >99.8% of the uranium was extracted from the liquor.

EXAMPLE G

SYNTHESIS OF DECONTAMINATED MAGNESIUM CHLORIDE SALT

Approximately 170 ml of the third raffinate solution generated in Example F was boiled gently for about 4 hours to a volume of about 30 ml. At this point, significant crystallization of salt occurred. The crystals were filtered from the liquid and dried at 90° C. for about 16 hours. The weight of the crystals was 19.6 grams. An aliquot of these crystals was dissolved in deionized water and analyzed for magnesium, chlorine, and uranium. The analytical data was: 13.9% Mg, 36.3% chlorine and <0.002% uranium, indicating that principally $MgCl_2 \cdot 6H_2O$, containing greatly reduced radioactivity, was synthesized. Over 80% of the magnesium input to the above dissolution and extraction processes was recovered as a chloride salt.

MANUFACTURE OF HYDROFLUORIC ACID

Hydrofluoric acid is typically produced by reacting calcium fluoride with concentrated sulfuric acid and distilling the hydrofluoric acid away from the insoluble calcium sulfate formed during the reaction, i.e.,

(13) $CaF_2 + H_2SO_4 \rightarrow 2HF_{(gas)} + CaSO_4$.

In the present invention, calcium fluoride is treated with high temperature steam or humidified gas comprised of one or more of $O_2$, $N_2$, Ar, air, or the like, to begin the process. The temperature of the steam is preferably around 1200° C., but could be as low as about 1000° C. and as high as about 1600° C. The fluorine atoms are efficiently desorbed to the steam and convert to hydrogen fluoride which is subsequently condensed and collected as hydrofluoric acid. Additional unit operations may be invoked at this point to further concentrate the hydrofluoric acid or generate anhydrous hydrogen fluoride therefrom, i.e.,

(14) $CaF_2 + H_2O_{(gas)}2 \rightarrow HF_{gas} + CaO$.

Calcium oxide is formed as the fluorine atoms are removed by the steam. After processing, the calcium oxide can be recovered as a resource. The calcium oxide can be blended with the feed calcium fluoride prior to processing in order to improve the handling characteristic of the material as it is processed.

The advantages of this embodiment over typical hydrofluoric acid productions are:

1. The use of sulfuric acid is mitigated;
2. The large volumes of calcium sulfate, which have very little value, are not generated;
3. Calcium values are recovered as calcium oxide, which has widespread use in various industries.

Reaction (14) above is efficiently operated with an excess of water to achieve maximum yields for both oxide formation and fluoride evolution. The resulting evolved fluoride product stream is generally at or below the azeotropic concentration of hydrofluoric acid. In order to enhance the hydrofluoric acid concentration produced from the fluoride matrix, e.g., $CaF_2$, to a higher level, e.g., to anhydrofluoric acid, a configuration as shown in FIG. 2 is applicable. In this scheme, the azeotropic aqueous phase from the disengagement section bottoms, e.g., distillation column, operated at from about 120° C. to about 20° C. is recycled to the reactor, vaporized as a steam phase, and used to disintegrate the fluoride matrix as previously described. This recycled phase reacts with the fluoride matrix and subsequently increases the vapor phase HF content to above the azeotropic level, i.e., above the level which the water in the system can retain as dissolved HF. This HF gas enhanced HF-water mixture can be subsequently treated in the aforesaid disengagement operation to produce a substantially purified anhydrous hydrofluoric acid steam, and an aqueous hydrofluoric acid azeotrope, which azeotrope, as described above, is subsequently recycled to the reactor as vapor phase digest medium feed steam.

It is noted that such an azeotropic recycle system for the production of anhydrous HF has been employed for $UF_6$ feed as more fully described in U.S. Pat. No. 5,346,684, the disclosure of which is hereby incorporated herein by reference.

EXAMPLE H

HYDROFLUORIC ACID GENERATION USING ACID GRADE FLUORSPAR

A test was performed using acid grade fluorspar $CaF_2$ of approximate composition: 97% $CaF_2$; 0.3% $SiO_2$. The test was performed at 1200° C. with steam passing over the sample. The sample was so treated for approximately 20 hours. About 4 liters of fluoride bearing (HF) condensate was produced. Approximately 73% of the feed fluoride was recovered in the condensate.

The invention has been described in detail with particular reference to preferred embodiments thereof, but it will be understood that variations and modifications will be effected with the spirit and scope of the invention.

I claim:

1. A process for treating a difficultly soluble feed matrix containing substantial quantities of fluoride reactant selected from the group consisting of calcium fluoride, magnesium fluoride, or mixture thereof, said method comprising contacting said matrix in thermal reactor means with a vaporous pyrohydrolysis system containing HF and water at temperatures of from about 200° C. to about 1600° C., said contacting being carried out such as to convert said fluoride reactant to metal oxide residues and to evolve gaseous HF from said matrix, separating the evolved gaseous HF from the aqueous portion of said system in a disengagement operation to produce a purified, substantially anhydrous HF gas product, and recycling said aqueous portion to said reactor means as a component of said vaporous pyrohydrolysis system.

2. The process of claim 1 wherein said disengagement operation is carried out in a distillation unit having a still section and a bottoms section, wherein the operating temperatures of said still section is from about 120° C. to about 20° C., and wherein the bottoms material comprises an HF in water azeotrope.

3. The process of claim 1 wherein said substantially anhydrous HF gas product is isolated from water in said distillation unit by fractional vaporization and condensation.

4. The process of claim 1 wherein said vaporous pyrohydrolysis system is essentially 100% humidified.

5. The process for converting feed materials of high mineral content containing primary metal values and fluorine values to the primary metal or useful compounds thereof and to fluorine values or useful compounds thereof, wherein said feed materials comprises a difficultly soluble matrix, said process comprising contacting said feed materials in reactor means with a humidified, gaseous system at from about 200° C. to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein an oxidizing agent is added to the humidified, gaseous system as an ancillary reactant selected from the group consisting of oxygen, peroxides, persulfates or alcohols in concentrations sufficient to provide an auxiliary reactive oxygen level of up to about the reactive oxygen capacity afforded by the original system.

6. The process for converting feed materials of high mineral content containing primary metal values and fluorine values to the primary metal or useful compounds thereof and to fluorine values or useful compounds thereof, wherein said feed materials comprises a difficultly soluble matrix, said process comprising contacting said feed materials in reactor means with a humidified, gaseous system at from about 200° C. to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein lanthanide series metal values are present in the feed materials.

7. The process for converting feed materials of high mineral content containing primary metal values and fluorine values to the primary metal or useful compounds thereof and to fluorine values or useful compounds thereof, wherein said feed materials comprises a difficultly soluble matrix, said process comprising contacting said feed materials in reactor means with a humidified, gaseous system at from about 200° C. to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein the water from said humidified, gasous system forms an azeotrope with a dissolved portion of said gaseous fluorides and wherein said azeotrope is separated from a remaining undissolved portion of said gaseous fluorides and is recycled back to said reactor means for further contact with said feed materials.

8. The process of claim 7 wherein said undissolved portion of said gaseous fluorides is recovered as anhydrous HF.

9. The process for converting feed materials of high mineral content containing primary metal values and fluorine values to the primary metal or useful compounds thereof and to fluorine values or useful compounds thereof, wherein said feed materials comprises a difficultly soluble matrix, said process comprising contacting said feed materials in reactor means with a humidified, gaseous system at from about 200° C. to about 1600° C,, said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein actinide series elements with atomic numbers ranging from 89 through 103 are present in said feed materials.

10. The process for converting feed materials of high mineral content containing primary metal values and fluorine values to the primary metal or useful compounds thereof and to fluorine values or useful compounds thereof, wherein said feed materials contain trace amounts of actinide series metals and comprises a difficultly soluble matrix, said process comprising contacting said feed materials in reactor means with a humidified, gaseous system at from about 200° C. to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein an organic medium is used to extract actinide series metal values from dissolved liquor.

11. The process for converting feed materials of high mineral content containing primary metal values and fluorine values to the primary metal or useful compounds thereof and to fluorine values or useful compounds thereof, wherein said feed materials comprises a difficultly soluble matrix, said process comprising contacting said feed materials in reactor means with a humidified, gaseous system at from about 200° C. to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor and from other components of said residues, and wherein the primary metal values are recovered as metal salts which are subsequently contacted with a reducing system to produce the metal.

12. The process for converting feed materials of high mineral content containing primary metal values and fluorine values to the primary metal or useful compounds thereof, wherein said feed materials comprises a difficultly soluble matrix, said process comprising contacting said feed materials in reactor means with a humidified, gaseous system at from about 200° to about 1600° C., said contacting being carried out such as to convert said primary metal values to oxide residues at commercially acceptable rates and to evolve gaseous fluoride from said feed, digesting said oxide residues in an acidic digest medium and separating the primary metal values from the resulting digest liquor said front other components of said residues, wherein the water from said steam or other humidified gas forms an azeotrope with a dissolved portion of said gaseous fluorides and wherein said azeotropic is separated from a remaining undissolved portion of said gaseous fluorides and is recycled back to said reactor for further contact will said feed material, and wherein said undissolved portion of said gaseous fluorides is recovered as anhydrous HF.

13. A process for converting feed materials of high mineral content containing primary metal values and substantial secondary metal values to concentrated primary and secondary metal products, wherein said feed materials comprises a difficulty soluble matrix containing substantial primary metal values which assay above about 10%, secondary metal values which assay above about 0.1% and fluorine, said process comprising contacting said feed materials with high temperature steam of from ant: 200° C. to about 1600° C., said contacting being carried out such as to convert said primary metal values and secondary metal values to oxide residues at commercially acceptable rates, and to evolve gaseous fluorides from said feed, digesting said oxide residues in an acidic digest medium, separating said secondary values from the resulting digest liquor, and subsequently isolating said primary metal values from the resulting raffinate.

14. The process of claim 13 wherein said secondary metal values are principally beryllium values.

15. The process of claim 13 wherein said feed materials contain substantial amounts of fluoride compounds selected from the group consisting of Group 1A, Group 2A, or lanthanide series in the Periodic Chart of the Elements.

16. The process of claim 13 wherein said steam is at a temperature of from about 800° C. to about 1300° C. and the contacting period is from about four to about six hours.

17. The process or claim 1 wherein said steam is at a temperature of from about 800° C. to about 1300° C. and the contacting period is from about four to about six hours.

18. The process of claim 13 wherein the contacting is from about two to about ten hours.

* * * * *